(No Model.)

S. HAMILTON.
THRASHING CYLINDER.

No. 481,864. Patented Aug. 30, 1892.

Witnesses,

Inventor,
Samuel Hamilton
By Dewey & Co.
Attys

THE NORRIS PETERS CO., PHOTO-LITHO., WASHINGTON, D. C.

UNITED STATES PATENT OFFICE.

SAMUEL HAMILTON, OF KING CITY, CALIFORNIA.

THRASHING-CYLINDER.

SPECIFICATION forming part of Letters Patent No. 481,864, dated August 30, 1892.

Application filed April 6, 1892. Serial No. 428,092. (No model.)

*To all whom it may concern:*

Be it known that I, SAMUEL HAMILTON, a citizen of the United States, residing at King City, Monterey county, State of California, have invented an Improvement in Thrashing-Cylinders; and I hereby declare the following to be a full, clear, and exact description of the same.

My invention relates to certain improvements in thrashing-cylinders and their teeth; and it consists in certain details of construction, which will be more fully explained by reference to the accompanying drawings, in which—

Figure 1:
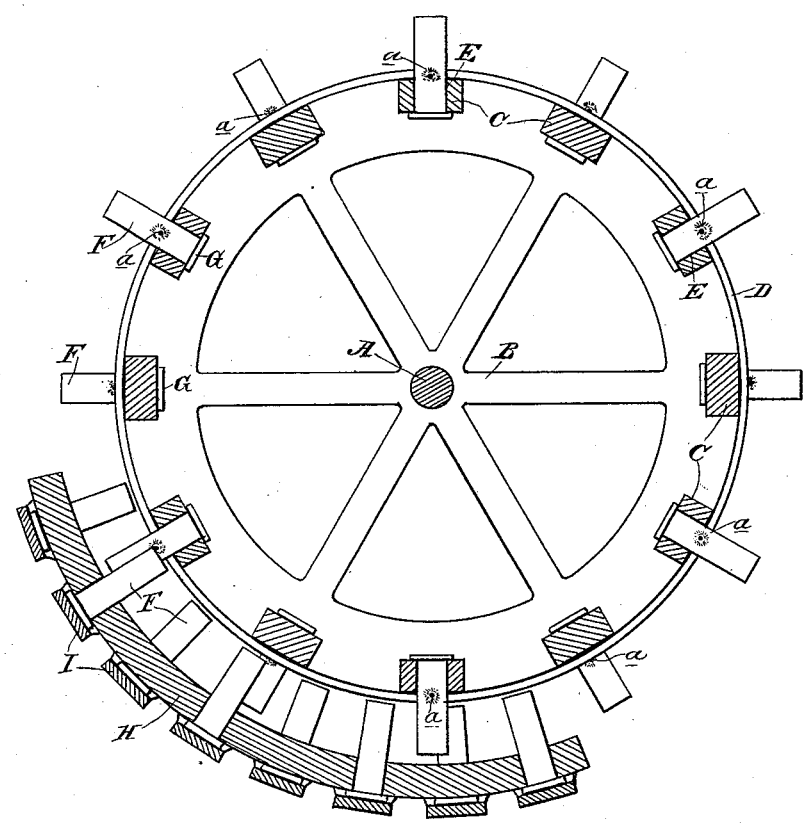
Figure 3:
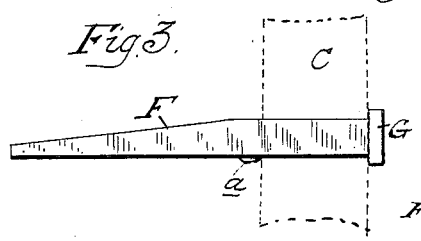
Figure 2:
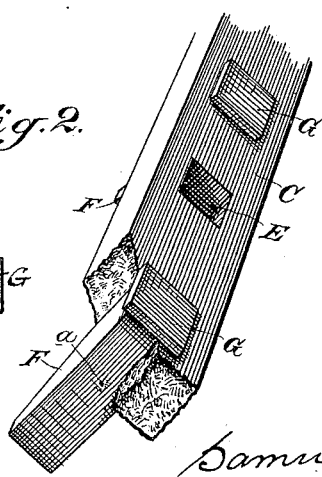

Figure 1 is a vertical cross-section through the cylinder and concave. Fig. 2 is a detail view of a tooth-bar and teeth. Fig. 3 is a detail showing an edge view of one of the teeth.

In the ordinary construction of thrashing-machine cylinders circular disks or spiders are fixed transversely to a central rotary shaft having bars around the periphery parallel with the shaft, and teeth are fixed in these bars at intervals by screw-threaded shanks at their inner ends, which pass through the holes in the bars and are secured by nuts on the inside. This construction is necessary because the outer ends of the teeth are made wedge-shaped in order to give them sufficient strength in the line of motion to resist the strain brought upon them by the straw and grain passing between the teeth of the cylinder and those of the corresponding concave at a high speed, and on account of this construction the teeth must be put in from the outside.

In my invention I make the teeth wedge-shaped in transverse section, tapering from the outer face of the cylinder-bars to the point, with the front and rear edges parallel, and I form a head upon the inner end of each tooth. Slots are made in the cylinder-bars, which are so shaped as to receive these teeth, which are introduced from the inside, and the centrifugal force of the cylinder when in rotation draws the teeth firmly into place with the heads against the inner sides of the bars and prevents their falling out.

In the drawings, A is the cylinder-shaft, and B B are the spiders secured to the shaft at intervals to form the desired length of cylinder. Around the periphery of these spiders B slots are made, into which the tooth-bars C are fixed, lying parallel with the shaft, and exterior to these tooth-bars are rings D, shrunk on at intervals, so as to hold them firmly in place. Each of these tooth-bars has slots made in it transversely, as shown at E—that is, the slots are rectangular in shape and have their longest diameter in the direction of the rotation of the cylinder.

The teeth F are made of steel and iron, the front edge being sufficiently hard to prevent wear by the constant attrition with the material to be thrashed. These teeth are made, as shown in the drawings, rectangular at the inner end and of an equal size for a length sufficient to pass through the thickness of the cylinder-bar, which is usually from one inch to one inch and an eighth in thickness.

Upon the inner end of the tooth is formed a head or enlargement G, which, when the tooth is seated, abuts against the inner face of the cylinder-bar. From the outer face of the cylinder-bar the teeth are made tapering or wedge-shaped in their shortest or transverse diameter; but in the diameter which is in the direction of their travel they are made of the same width from the inner end to the outer. By this construction the tooth is greatly strengthened and prevented from breaking at the point where it is secured into the cylinder-bar.

In the ordinary construction where the teeth are formed with screw-shanks passing through holes in the cylinder-bar with the nut upon the inner end, the weakest point is at the junction of the tooth with the bar. Being of smaller diameter than the outer ends and having the additional weakness of the screw-threads, they are very liable to break at this point.

By my construction the strongest portion of the tooth is that portion in the bar and just outside of it.

The great advantage in the construction of my tooth is that as no screw-threads or nuts are used no time is lost in taking them out or putting them in. All the teeth in the cylinder may be slipped into their respective bars with the fingers, and if the heads do not exactly seat at first they will be drawn into place by centrifugal force as soon as the cylinder is set into revolution. In order to remove them it is only necessary to tap them with a hammer from the outside, when they can be as easily removed. No time is lost, as in the old construction, where it is necessary to stop occasionally and see that the nuts are all tight to prevent the teeth from flying out and causing great damage by breakage.

In order to retain the teeth in place when the cylinder is stationary, in case they are loose in the holes in the tooth-bars, a small indentation *a* is made in the side of the tooth close to the tooth-bar on the outside by means of a prick-punch struck with the hammer, and the slight amount of metal thus forced up on the side of the indentation is sufficient to prevent the tooth from falling out by gravitation. The centrifugal force will retain it in place while the machine is in motion.

The teeth of the concave H are put in from the outside in the same manner, and as the action of the straw between the rapidly-revolving cylinder-teeth and those of the concave tends to draw the concave-teeth inwardly instead of forcing them outwardly it is not necessary to secure them in any other way; but to prevent their dropping out in case of looseness or misfit I prefer to fix bars I beneath each line of the concave teeth. These bars may be screwed or otherwise lightly secured at each end, and if it is necessary to remove any of the teeth from the concave it will only be necessary to remove the bar to leave them free to be taken out.

Having thus described my invention, what I claim as new, and desire to secure by Letters Patent, is—

1. In a thrashing-machine, the cylinder consisting of the shaft having the disks or spiders secured to it, the bars secured to the periphery of the disks or spiders parallel with the shaft and having rectangular slots made through them, and thrashing-teeth fitted to said bars and held therein by the centrifugal force of the cylinder, said teeth being of approximately rectangular shape in cross-section, having the front and rear edges parallel from end to end, and the sides parallel for a portion of their length from the base, and thence decreasing in diameter to the outer end, substantially as herein described.

2. In a thrashing-cylinder, a cylinder consisting of disks or spiders secured to a central rotary shaft having tooth-bars fixed to their peripheries parallel with the central shaft, rectangular slots made radially in the tooth-bars, teeth having heads upon their inner ends, rectangular in section, corresponding with the openings in the tooth-bars, and a wedge-shaped or tapering transverse section exterior to the bars with the front and rear faces parallel, and indentations made upon the sides of the teeth exterior to the tooth-bars, whereby the metal is raised above the surface around the indentations to prevent the teeth from falling out when the machine is at rest, substantially as herein described.

3. A thrashing-machine tooth of approximately rectangular shape in cross-section, having the front and rear edges parallel from end to end and the sides parallel for a portion of the length from the base and thence decreasing in diameter to the outer end, substantially as herein described.

4. A thrashing-machine tooth of approximately rectangular form in cross-section, having an integral head at the inner end, the edges which are in the line of travel being parallel from end to end and the sides parallel for a portion of the length outward from the head and thence converging to the outer end, substantially as herein described.

In witness whereof I have hereunto set my hand.

SAMUEL HAMILTON.

Witnesses:
S. H. NOURSE,
J. A. BAYLESS.